June 20, 1944.　　　　J. A. KENNEDY　　　　2,352,104
CONTROL SYSTEM FOR MOTOR VEHICLES
Filed Jan. 19, 1942　　　　3 Sheets-Sheet 1

INVENTOR
James A. Kennedy
BY Gregory S. Dolgoruker
ATTORNEY

June 20, 1944.  J. A. KENNEDY  2,352,104
CONTROL SYSTEM FOR MOTOR VEHICLES
Filed Jan. 19, 1942     3 Sheets-Sheet 2
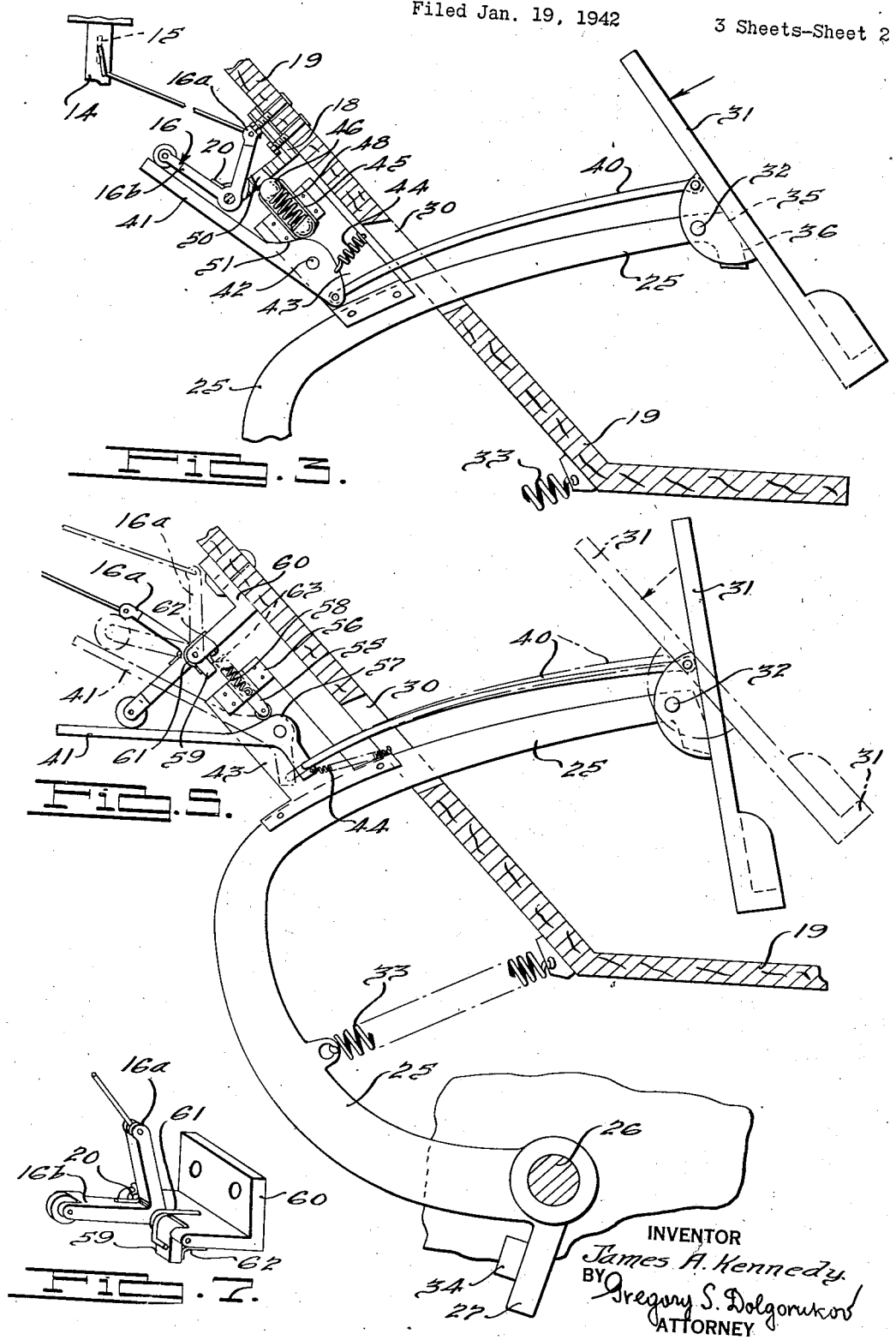

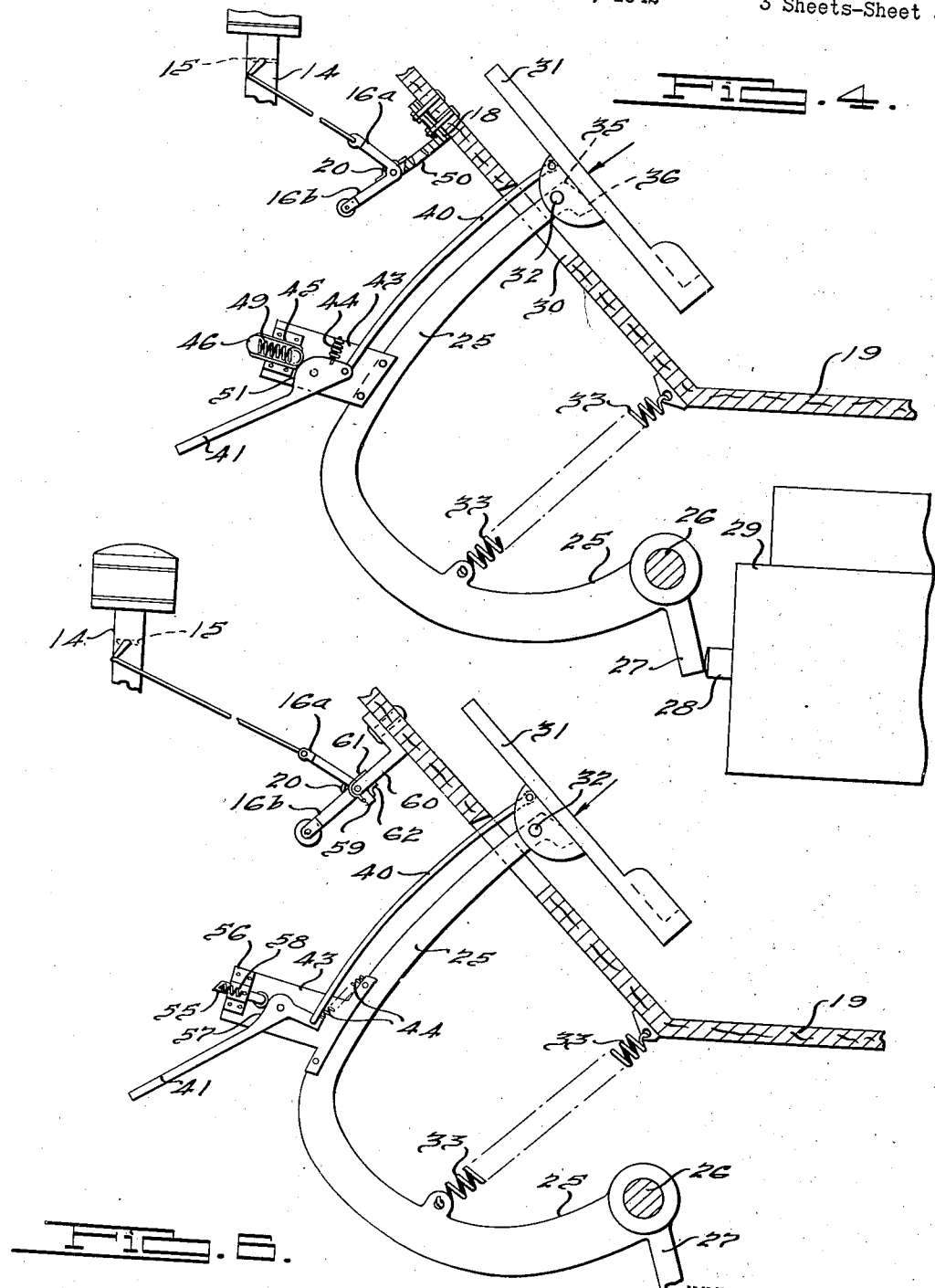

Patented June 20, 1944

2,352,104

UNITED STATES PATENT OFFICE 2,352,104

CONTROL SYSTEM FOR MOTOR VEHICLES

James A. Kennedy, Ann Arbor Township, Washtenaw County, Mich.

Application January 19, 1942, Serial No. 427,220

4 Claims. (Cl. 192—3)

This invention relates to motor vehicles and more particularly to an improved motor and brake control system therefor.

One of the objects of the present invention is to provide an improved unitary control system for the engine and the brakes of a motor vehicle.

Another object of the present invention is to provide an improved motor vehicle in which separate accelerator and brake pedals are eliminated, and operation of the brakes as well as control of the throttle valve of the vehicle engine is effected with the aid of a single pedal.

A further object of the present invention is to provide an improved motor vehicle in which control of the engine and of the brakes is attained with the aid of a single articulated pedal, in which pedal control of the engine is attained with the aid of a swinging pedal member actuated by light foot movements similar to those used for actuating a conventional accelerator pedal, while control of the brakes is attained with the aid of bodily movements of the entire pedal structure attained by heavier efforts of the operator's leg, similar to those used in operating conventional brake pedals.

A still further object of the present invention is to provide an improved motor vehicle having means eliminating the necessity for the vehicle operator transferring his foot from the accelerator pedal to the brake pedal in cases of sudden stops and thus considerably shortening the time necessary for application of brakes in emergencies.

A still further object of the invention is to provide an improved motor vehicle with an engine having a throttle and wheels having brakes associated therewith, means being provided to prevent application of the brakes while the throttle is being operated, there being also provided means preventing objectionable opening of the throttle valve when the brakes are suddenly applied.

A still further object of the present invention is to provide an improved engine and brake control system, means being provided to bring the engine throttle into its idling position as the brakes are applied.

A still further object of the invention is to provide an improved motor vehicle having a single pedal for operating both the engine throttle and the brakes, said pedal being adapted to be operated while in its extended position to actuate the throttle valve, means being provided to furnish in said position of the pedal a sufficient support for the operator's foot, said support not to be affected by position of the throttle valve, in order to ensure proper and convenient operation of the throttle, but not to prevent easy and fast application of brakes when such a necessity arises.

A still further object of the invention is to provide an improved motor vehicle having an engine with a throttle valve and wheel brakes, a single pedal for operating said throttle valve and said brakes, means being provided, whereby brakes may be applied from any throttle controlling position of said pedal, i. e. without the necessity of returning said pedal to its position corresponding to the idling position of the throttle valve.

A still further object of the present invention is to provide an improved motor vehicle having an engine with a throttle valve and wheel brakes, a single pedal for operating said valve and said brakes, means being provided whereby said pedal may be depressed for application of brakes and permitted to return to its extended position without affecting the idling position of the throttle valve.

It is an added object of the present invention to provide a structure of the foregoing character, which is simple in construction, safe and dependable in operation, and is relatively inexpensive to manufacture and service.

Other objects of this invention will appear in the following description and appended claims, reference being had to the accompanying drawings forming a part of this specification wherein like reference characters designate corresponding parts in the several views.

Fig. 3 is a view similar in part to Fig. 2, the pedal structure being shown in its fully extended position, but the foot rest being depressed in order to actuate the throttle valve and to bring it in its fully open position.

Fig. 4 is a view similar in part to Figs. 2 and 3, the pedal structure being shown in its fully retracted position for application of brakes, the throttle valve being shown returned into its idling position.

Fig. 5 is a diagrammatic view illustrating a modified construction of my improved brake and throttle valve control system, the modification residing mainly in the pedal structure supporting means, the pedal structure being shown in its fully extended position and the foot rest being shown in its fully released position in solid lines, and in its fully depressed position in dotted lines, the relative positions of the throttle valve actuating means being shown correspondingly in the solid and dotted lines.

Fig. 6 is a view similar in part to Fig. 5, the pedal being shown in its fully retracted position for application of brakes, with the throttle valve returned into its idling position.

Fig. 7 is a fragmentary perspective view illustrating the throttle valve actuating bell crank and mounting bracket therefor.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The present invention is herein described as embodied in a motor vehicle propelled by an internal combustion engine and having four wheel brakes of the hydraulic type. It will be understood, however, that the invention is not limited to vehicles having engines or brakes of the above specified type but may be used successfully in connection with the different types of engines and brakes.

Figure 1:
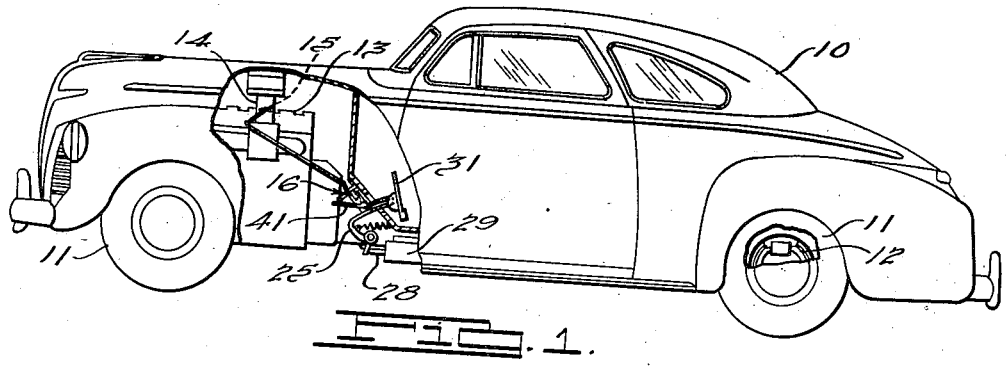
Fig. 1 is a view showing a motor vehicle embodying the present invention, parts of the motor vehicle structure being cut out in order to show the construction thereof more clearly.

Referring to the drawings, and particularly to Fig. 1 thereof, the structure illustrated therein is a motor vehicle of the passenger type, indicated generally by the numeral 10. The motor vehicle may be of any suitable type, and therefore no detailed description thereof is deemed necessary herein. The vehicle includes wheels 11 each provided with a brake mechanism generally indicated by the numeral 12. Provision of a brake on each wheel is in conformity with the present practice but it is not necessary for proper operation of the structure embodying the present invention. The brakes may also be of any suitable type, hydraulic brakes being shown in the present instance. An engine 13, in the present instance of the internal combustion type, is mounted on the vehicle structure. Connection of the engine with the driving wheels and clutch means for selectively disconnecting the engine from the wheels may also be of any practical type. The engine includes an intake passage 14 in which there is operatively mounted a throttle valve 15. Said throttle valve is adapted to be moved between its substantially closed or idling position and its fully open position, thereby controlling the engine from its idling condition to the condition in which it delivers its maximum torque.

The throttle valve 15 is actuated with the aid of a suitable mechanism, in the present instance with the aid of a bell crank 16 hingedly mounted at 17 on a bracket 18 secured to the floor structure 19 of the vehicle 10. One leg of said bell crank 16, in the present instance the leg 16a, is connected with the aid of a suitable linkage shown in the drawings in a diagrammatic manner, with a throttle valve 15 rotatively mounted within said passage 14. The lower leg 16b of the bell crank 16 is adapted to be actuated with the aid of a mechanism hereinafter described in detail to rotate said bell crank around the hinge 17 in the direction to open said valve 15. In the present embodiment of the invention movements of the throttle valve 15 toward its fully open position are effected by moving the end of the lower leg 16b of the bell crank upwardly. A spring 20 anchored on the bracket 18 is provided, said spring being adapted to act on the bell crank 16, and to move it in the return direction, thereby ensuring the return of the throttle valve 15 into its substantially closed or idling position when the valve opening force ceases to act on the leg 16b.

Figure 2:
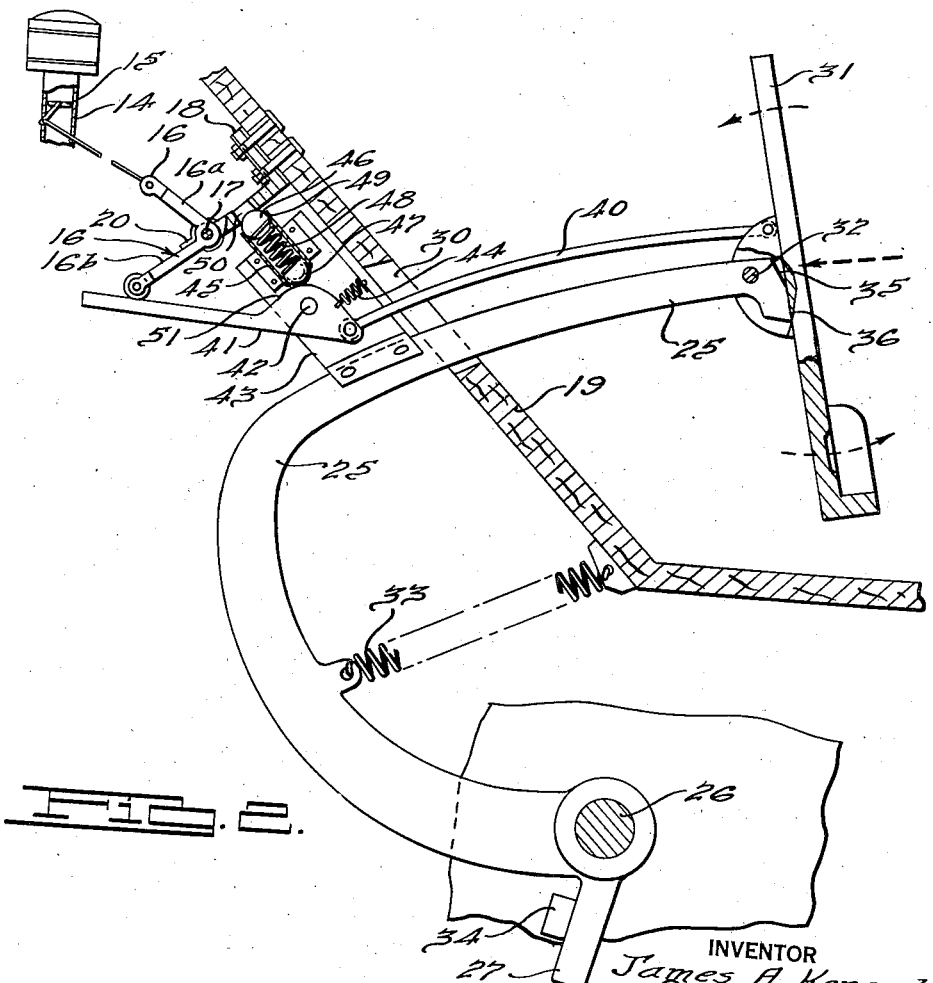
Fig. 2 is a diagrammatic view illustrating my improved brake and throttle valve control system, the articulated pedal being shown in its fully extended position, and the foot rest in its fully released position corresponding to the idling position of the throttle valve.

In accordance with the invention means are provided to actuate the bell crank 16 for moving the throttle valve 15 in the opening direction, the spring 20 being depended upon for returning said throttle valve 15 into its idling position, as mentioned. In accordance with the invention said means are provided on a single articulated pedal, which pedal is used both for operating the brakes of the vehicle as well as the engine thereof to control said throttle valve 15. In the present embodiment of the invention the single pedal structure provided for controlling the engine and the brakes of the vehicle carries a rotatively mounted member, rotation of which operates to move special crank means so as to actuate the bell crank 16 in the valve opening direction. Said rotative movements are operative for controlling the throttle valve 15 only, while bodily movements of the entire pedal structure produced by the pressure of the operator's foot thereon are effective to operate only the brakes of the vehicle. More particularly, the articulated pedal is so constructed that bodily movements thereof are inoperative to effect controlling movements of the throttle valve 15, and as soon as the pedal structure is moved for application of the brakes 12, the spring 20 becomes effective to move the bell crank 16 for returning the throttle valve 15 into its idling position. In order to attain the above results, the articulated pedal structure comprises a bent stem 25 having one end hingedly mounted on the vehicle structure as shown at 26. On said end of the stem 25 there is provided a tooth or crank 27 adapted to act on a plunger 28 of a hydraulic master cylinder 29 of the hydraulic brake system. The opposite end of the stem 25 passes through an opening 30 provided in the floor structure 19 of the vehicle, and it carries a foot rest 31 hingedly mounted thereon as shown at 32. A brake spring 33 is provided, said spring being adapted, unless opposed by the foot pressure on the foot rest 31, to maintain said pedal structure in its fully extended position as shown in Fig. 2. Said extended position of the brake pedal structure may be determined or fixed with the aid of any suitable stop means provided on the vehicle structure, such for instance as with the aid of a stop 34 contacted by the tooth 27 in the fully extended position of the pedal.

It will now be clear in view of the foregoing that when foot pressure is applied to the foot rest 31, which foot pressure exceeds and overcomes the resistance of the brake spring 33, the entire pedal structure may be moved around the hinge 26 as a center from its fully extended position shown in Fig. 2 toward and into its fully retracted position shown in Fig. 4. In the process of such movement the tooth 27 forces the plunger 28 into the master cylinder 29, thereby creating hydraulic pressure within the brake system and thus operating to apply brakes. When, on the other hand, foot pressure on the foot rest 31 ceases, the spring 33 becomes capable of returning the pedal structure from its fully retracted position into its fully extended position. Thus operation of the brakes is effected by bodily movements of the entire pedal structure.

Operation of the throttle valve 15 and control of the engine is attained with the aid of rotative movements of the foot rest 31. Said foot rest 31 is mounted on the stem 25 of the pedal structure for a limited rotative movement between its fully released position shown in Fig. 2 and fully depressed position shown in Fig. 3. For the purpose of clarity of terminology herein employed, it should be noted at this point that with respect to the rotative movements of the foot rest 31 the extreme positions thereof will be referred to as "fully released" and "fully depressed" positions thereof, while with respect to the entire pedal structure, the terms used to indicate extreme positions thereof are "fully extended" and "fully retracted" positions. The extreme limits of the fully released and fully depressed positions of the foot rest 31 are determined by the angularly related surfaces 35 and 36 provided on the bent end of the stem 25. Surface 35 serves as a stop for the foot rest 31 in the fully depressed position thereof, while the surface 36 serves as a stop for said foot rest 31 in the fully released position thereof.

The rotative or swinging movements of the foot rest 31 are transmitted with the aid of a rod 40 to a crank 41 hingedly mounted as at 42 on the bracket 43 secured to and carried by the pedal stem 25. Thus when the foot rest 31 is depressed to cause its rotative movement into the position shown in Fig. 3, the rod 40 rotates the crank 41 around the hinge 42, and said crank presses on the leg 16b of the bell crank 16 to bring the throttle valve 15 into its fully open position. As the foot rest 31 is moved or depressed to bring it into any intermediate position between its fully released and fully depressed positions, the throttle valve 15 will correspondingly be moved to a definite intermediate position between its idling position and its fully open position.

When the foot pressure on the foot rest 31 becomes strong enough to overcome the resistance of the brake spring 33, the entire pedal structure moves bodily around the hinge 26 as a center, carrying with it the bracket 43 and the crank 41. When such bodily movement of the brake pedal is effected, the crank 41 loses contact with the bell crank 16 and moves toward the position shown in Fig. 4. When the bell crank 16 is not acted upon by the crank 41, the spring 20 acts to return the throttle valve 15 into its idling position. It should be noted that when application of brakes is done from an open or partially open position of the valve 15 and, consequently, from depressed or partially depressed position of the foot rest 41, for the first few moments of the bodily movement of the pedal structure toward its retracted position, the contact of the crank 41 and bell crank 16 continues but because of the bodily movement of the crank 41 the bell crank rotates toward its position indicated in Fig. 4, thereby returning the throttle valve 15 toward its idling position. Thus as soon as the pedal structure is moved bodily for application of brakes, the throttle valve is automatically brought into its idling position. When after application of brakes the pedal structure is permitted, by withdrawing the foot, to return to its fully extended position, which return movement is effected by the action of the spring 33, the crank 41 is returned by the action of a spring 44 into its position corresponding to the idling positions of the bell crank 16 and the throttle valve 15. Therefore, when continued movement of the pedal structure brings the crank 41 in contact with the bell crank 16, the same does not operate to open the throttle valve 15.

In accordance with the invention, means are provided to support the pedal structure in its fully extended position where only operation of the throttle valve 15 is desired and where it is desirable and necessary to prevent the entire pedal structure from moving bodily from said position under the weight of the operator's foot or under the pressure thereof necessary to produce rotative movements of the foot rest 31. In the present embodiment of the invention said means comprise a spring-and-ball device carried by the bracket 43 and therefore movable with the stem 25. Said means comprise a tube bracket 45 which carries two balls 46 and 47 acted upon by a compression spring 48, tending to move said balls outwardly. In order to retain the balls in the tube, the edges of the tube bracket 45 are bent or rolled inwardly thereof as shown at 49 after the balls and spring are inserted therein. The upper ball 46 is adapted in the fully extended position of the pedal structure to engage a depression or indentation provided in the vehicle structure, said indentation being of such a character that it requires a predetermined force to move said device and consequently the bracket 43 and stem 25 from their respective positions at which said ball is in position to engage said indentation. In the present embodiment of the invention the depression is furnished by a hole 50 provided in the bracket 18. Thus when the pedal is in its fully extended position, the spring-and-ball device described above operates to support the pedal in said position unless and until a strong depressing force is applied to the pedal structure, as is the case when it becomes necessary to apply brakes. When such strong force is applied to the pedal through the foot rest 31 thereof, the ball 46 is pressed inwardly of its tube bracket 45 and the pedal may move bodily for application of brakes. On the return movement of the pedal the spring 33 carries the ball 46 over the edges of the depression or indentation provided by the hole 50 and again brings the pedal into its fully extended position, in which position it is supported by the above described device.

Means are provided whereby the force produced by the spring-and-ball device and supporting the pedal structure against the forces necessary to operate the foot rest 31 for actuating the throttle valve 15 is increased as said throttle valve is moved toward its fully open position. In the present embodiment of the invention said means are represented by the spring 48 and a cam portion 51 provided on the crank 41. The cam portion 51 is so shaped that as the foot rest is actuated to move the throttle valve 15 toward its fully open position, said cam portion 51 presses the ball 47 inwardly of the tube and compresses the spring 48 still further. Because of greater compression of the spring 48, the upper ball 46 presses into the hole 50 with a greater force, and therefore it requires correspondingly greater force to move said ball out of the hole 50. By virtue of such a construction, undesirable application of brakes when the foot rest 31 is suddenly forced in for accelerating the vehicle, such as may happen after the traffic light changes, is prevented.

Figs. 5 to 7 illustrate a structure similar to that described in Figs. 1 to 4 but having pedal supporting means of a modified character. In its other particulars said modified structure is similar to the structure described in said Figs. 1 to 4, and therefore only those parts of the structure of Figs. 5 to 7 will be described in detail which include such modification. Also, parts of both of said structures which are similar in their construction are designated by the same numerals.

In the structure illustrated in Figs. 5 to 7 inclusive, instead of the spring-and-ball device used in the structure of Figs. 1 to 4, a finger 55 carried by a tube bracket 56 is employed. Said finger 55 has one end having a roller contacting a cam portion 57 substantially similar to the cam portion 51 of the structure shown in Figs. 1 to 4. A tension spring 58 mounted on the tube bracket 56 tends to maintain said finger in its fully retracted position shown in Fig. 5. Said cam portion 57 is so shaped that when the foot rest 31 is in its fully released position, the finger 55 is about to come into engagement with a tooth 59 mounted on the bracket 60 as is best shown in Fig. 7. By the action of a spring 61 said tooth is maintained in position shown in said Fig. 7 being pressed against said spring 61 (having such permanent set as not to be able to move the tooth 59 further to the right than shown in Figs. 5 to 7) by a weaker spring 62 provided on said bracket 60. However, said tooth may be moved to the left (in Fig. 7) against the resistance of the spring 61. Thus when the pedal structure is in its fully extended position with the foot rest 31 in its fully released position, which conditions correspond to the idling position of the throttle valve 15, said device does not provide any support for the pedal structure and the same is held in its fully extended position only by the action of the brake spring 33. Therefore, the brakes may be applied with a very gentle force of the foot. However, as soon as the foot rest 31 is moved to operate the throttle valve and to move the same toward its open position, the cam portion 57 operates to move the finger 55 to engage said tooth 59 and therefore to exert on the pedal structure a yielding force capable of supporting said pedal structure and preventing the possibility of bodily movements thereof due to the throttle operating foot pressure exerted on the foot rest 31. When, however, strong brake applying pressure is exerted on the pedal structure, the finger 55 moves the tooth 59 against action of the spring 61, and the entire pedal structure may be bodily moved for application of the brakes similarly to the pedal structure illustrated in Figs. 1 to 4 inclusive. When the pedal structure moves into position shown in Fig. 6, the throttle valve is automatically returned into its idling position, and the finger 55 is also moved into its retracted position. Therefore when after application of the brakes the pedal structure returns, because of the action of the brake spring 33, into its fully extended position, the finger 55 clears the tooth 59 and may be returned into its original position without being caught by the tooth 59.

In order to prevent catching of the finger 55 by the tooth 59 and detaining the pedal structure by said tooth in cases where the operator presses the foot rest before the pedal structure returns into its fully extended position, the top of the finger 55 is slanted as shown at 63, and therefore under such conditions the tooth 59 acts as a cam permitting the pedal structure to come into its fully extended position. The spring 62 operates under such conditions to carry the tooth 59 over the slanted top of the finger 55. With respect to other features of construction, the structure illustrated in Figs. 5 to 7 is similar to the structure described in Figs. 1 to 4, and no further description thereof is deemed necessary.

There is thus provided an improved motor vehicle having a single member, such as the foot rest 31, for controlling both the throttle valve and the brakes of said vehicle, which member is capable of two types of movement, first, rotative movement around a stationary center, in the present instance the hinge 32; and second, bodily movement through a predetermined distance for application of brakes. These two types of movements are similar to those with which conventional separate accelerator and brake pedals are operated, but in the present construction they are brought together into one locality and a single articulated pedal, whereby the objects of the present invention and numerous additional advantages are attained.

I claim:

1. In a motor vehicle having an engine and wheels, a throttle valve controlling said engine, brakes acting on said wheels for slowing down and stopping said vehicle, a single pedal structure comprising a stem hinged on the vehicle structure and connected to the brakes for operating the same and a foot rest hingedly mounted on said stem for limited rotative movement thereon and connected to the throttle valve, means associated with said foot rest, said means being adapted in the fully extended position of the stem to connect said foot rest to said throttle valve for actuating said valve in response to rotative movements of said foot rest, said means being further adapted to disconnect said foot rest from said throttle valve as said pedal structure is depressed to move said stem for application of brakes, and means to support said stem in the fully extended position thereof and to prevent brake applying movement thereof until the force on said stem reaches a predetermined magnitude, and means increasing the resistance of said stem-supporting means as the throttle valve is moved toward its fully open position.

2. In a motor vehicle having an engine and wheels, a throttle valve controlling said engine, brakes acting on said wheels for slowing down and stopping said vehicle, a single pedal structure comprising a stem hinged on the vehicle structure and connected to the brakes for operating the same and a foot rest hingedly mounted on said stem for limited rotative movement thereon and connected to the throttle valve, means associated with said foot rest, said means being adapted in the fully extended position of the stem to connect said foot rest to said throttle valve for actuating said valve in response to rotative movements of said foot rest, said means being further adapted to disconnect said foot rest from said throttle valve as said pedal structure is depressed to move said stem for application of brakes, and a spring-and-ball means mounted on said stem and adapted in the fully extended position of the stem to engage an indentation provided on the vehicle structure and thereby to resist brake applying movement of said stem until the force acting thereon reaches a predetermined magnitude, and means adapted to increase the deflection of said spring-and-ball means as the foot rest is moved in the fully extended position of the stem toward its position corresponding to the fully open position of the throttle valve.

3. In a motor vehicle having an engine and wheels, a throttle valve controlling said engine, a hinged member connected to said throttle valve and adapted when acted upon by an extraneous force to move said valve toward its fully open position, spring means associated with said member and adapted when unopposed by said force to return said throttle valve into its idling position, a single articulated pedal structure comprising a stem having one end hingedly mounted on the vehicle structure for swinging movements between its fully retracted and extended positions and connected to said brakes for operating the same, and a foot rest hingedly mounted on the other end of said stem for limited rotative movements thereon, crank means carried by said stem and connected to said foot rest to be actuated thereby, said crank means being adapted in the fully extended position of said stem to contact said hinged member and to operate the same by exerting a force thereon in response to the rotative movements of said foot rest, said crank means being further adapted to lose contact with said hinged member relieving said force when the stem is swung toward its fully retracted position for application of brakes, and a device including a cam-and-follower mechanism associated with said crank means, said device being adapted to be moved by said crank means in depressed positions of said foot rest to support the same bodily but not rotatively against the action of the foot rest depressing forces.

4. In a motor vehicle having an engine and wheels, a throttle valve controlling said engine, a hinged member connected to said throttle valve and adapted when acted upon by an extraneous force to move said valve toward its fully open position, spring means associated with said member and adapted when unopposed by said force to return said throttle valve into its idling position, a single articulated pedal structure comprising a stem having one end hingedly mounted on the vehicle structure for swinging movements between its fully retracted and extended positions and connected to said brakes for operating the same, and a foot rest hingedly mounted on the other end of said stem for limited rotative movements thereon, crank means carried by said stem and connected to said foot rest to be actuated thereby, said crank means being adapted in the fully extended position of said stem to contact said hinged member and to operate the same by exerting a force thereon in response to the rotative movements of said foot rest, said crank means being further adapted to lose contact with said hinged member relieving said force when the stem is swung toward its fully retracted position for application of brakes, and a device including a cam-and-follower mechanism associated with said crank means, said device being adapted to be moved by said crank means in depressed positions of said foot rest to support the same bodily but not rotatively against the action of the foot rest depressing forces, said device being further adapted to be inoperative so as to support said foot rest in the fully released position thereof.

JAMES A. KENNEDY.